United States Patent [19]

Eckert

[11] Patent Number: 4,557,849

[45] Date of Patent: Dec. 10, 1985

[54] PROCESS FOR THE PREPARATION OF OIL-SOLUBLE HYDROGENATED MODIFIED STAR-SHAPED POLYMERS

[75] Inventor: Rudolf J. A. Eckert, Amsterdam, Netherlands

[73] Assignee: Shell Oil Company, Houston, Tex.

[21] Appl. No.: 630,914

[22] Filed: Jul. 13, 1984

[30] Foreign Application Priority Data

Aug. 4, 1983 [GB] United Kingdom ................. 8321007

[51] Int. Cl.$^4$ ...................... C08F 293/00; C10M 1/32; C10M 3/26; C10M 5/20
[52] U.S. Cl. ................................ 252/51.5 R; 252/50; 525/153; 525/154; 525/280
[58] Field of Search ............. 525/280; 252/50, 51.5 R

[56] References Cited

U.S. PATENT DOCUMENTS 4,358,565 11/1982 Eckert .................................. 525/280

Primary Examiner—Jacob Ziegler
Attorney, Agent, or Firm—Peter A. Bielinski

[57] ABSTRACT

A process for the preparation of an oil-soluble, star-shaped product having viscosity index-improving and dispersant properties, comprising modifying a hydrogenated star-shaped polymer wherein said arms are hydrogenated homopolymers and copolymers of conjugated dienes and mono-alkenyl arenes, and wherein the hydrogenated polymer is metallated with an organolithium compound in the presence of a metallation promoter, and subsequently reacted with a vinyl pyridine or a carbonyl group containing organic compound.

9 Claims, No Drawings

PROCESS FOR THE PREPARATION OF OIL-SOLUBLE HYDROGENATED MODIFIED STAR-SHAPED POLYMERS

This invention relates to a process for the preparation of an oil-soluble, star-shaped product having viscosity index-improving and dispersant properties, comprising modifying a hydrogenated star-shaped polymer comprising a nucleus and polymeric arms linked to said nucleus, wherein said arms are selected from the group consisting of:

(i) hydrogenated homopolymers and hydrogenated copolymers of conjugated dienes;
(ii) hydrogenated copolymers of conjugated dienes and monoalkenyl arenes; and
(iii) mixtures thereof; and wherein at least about 80% of the aliphatic unsaturation of the star-shaped polymer has been reduced by hydrogenation while less than 20% of the aromatic unsaturation has been reduced.

Such a process, wherein the modification is carried out by free radical grafting the hydrogenated polymer with a nitrogen-containing polymerizable organic polar compound, such as a vinyl pyridine, is known as described in U.S. Pat. No. 4,358,565, which is herein incorporated by reference.

This known process has the disadvantage that cross-linking may occur during the introduction of the polar groups, which results in a decreased oil-solubility, shear-stability and reproducibility of the process.

According to the present invention this disadvantage can be avoided, and superior viscosity index-improving and dispersant properties in lubricating oils can be obtained by metallization of the hydrogenated star-shaped polymer prior to modification.

Therefore this invention relates to the above-mentioned process, characterized in, that the hydrogenated polymer is metallated with an organolithium compound in the presence of a metallation promoter, and subsequently reacted with (a) a vinyl pyridine, or
(b) a carbonyl group containing organic compound, or (a) followed by (b).

The resulting product possesses polar moieties which are spread out along the polymeric arms.

This invention furthermore relates to the resulting products and to oil compositions, in particular lubricating oil compositions or concentrates containing them.

The hydrogenated star-shaped polymers and their preparation are described in the above-mentioned U.S. Pat. No. 4,358,565. The number average molecular ($\overline{Mn}$) is preferably above 300,000, e.g., 350,000 to 1,000,000.

The metallization is preferably carried out with secondary-butyllithium and as promoter a tertiary diamine, in particular N,N,N',N'-tetramethyl ethylenediamine (TMEDA) in a molar ratio of promoter to organolithium compound of 0.5 to 1.2, in particular about 1, (a small excess of promoter, e.g., up to 10 mole %, is desirable) in a suitable solvent such as used in the preparation of the star-shaped polymer, e.g., cyclohexane, at a temperature of $-80°$ to 150° C., e.g., 0° and 90° C., e.g., about 70° C. and at normal pressure or at elevated pressure of, e.g., 1–5 bar, to prevent entrance of air. The reaction time can be from 1 to 24 hours.

The number of moles of organolithium compound is usually less than 150 and preferably 10 to 70 per mole of polymer.

This metallization generates living ends (Li-ions) which can be reacted with (a) a vinyl pyridine, in particular 2- and/or 4-vinyl pyridine, or with (b) a carbonyl group containing organic compound, in particular acetaldehyde and/or acetone, thus introducing secondary or tertiary OH-groups, simultaneously terminating the active sites, or with (a) followed by (b).

In particular step (a) may be carried out at $-78°$ to 80° C. in a solvent such as cyclohexane.

Step (b) may also be carried out in a solvent, such as cyclohexane, and at temperatures of 0°–150° C. The molar ratio carbonyl groups: Li-ions is, e.g., 0.1 to 10, preferably about 1 with a slight excess of, e.g., up to 10 mole % of carbonyl groups. A small amount of an alcohol, e.g., 2-ethyl hexanol, may be added to kill any remaining Li-ions.

Suitable carbonyl group containing compounds are saturated or unsaturated, linear or branched aldehydes, ketones and esters such as aldehydes and ketones containing up to, e.g., 30 carbon atoms and esters of mono- and/or polyols and mono- and/or poly carboxylic acids and mixtures of these compounds.

Although linear polymers can be modified as described herein, the shear stability will be lower than of the present star-shaped polymers.

The reaction product of this invention can be incorporated in oil compositions, in particular lubricating oil compositions, e.g., automotive crankcase oils, in concentrations within the range of 0.001 to 15, in particular 0.1 to 15, preferably 0.1 to 3, %w based on the weight of the total compositions. The lubricating oils to which the additives of the invention can e added include not only mineral lubricating oils, but synthetic oils also. Synthetic hydrocarbon lubricating oils may also be employed, as well as non-hydrocarbon synthetic oils including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. Mixtures of these oils, in particular of mineral lubricating oils, including hydrogenated oils, and synthetic lubricating oils, can also be used.

When used in gasoline or fuel oil, e.g., diesel fuel, etc., then usually 0.001 to 0.5%w, based on the weight of the total composition of the reaction product will be used.

Concentrates comprising a minor proportion, e.g., 15 to 45%w of said reaction product in a major amount of hydrocarbon diluent, e.g., 85 to 55%w mineral lubricating oil, with or without other additives present, can also be prepared for ease of handling.

In the above compositions or concentrates, other conventional additives may also be present, including dyes, pour point depressants, antiwear, e.g., tricresyl phosphate, zinc dialkyl dithiophosphates of 3 to 8 carbon atoms, antioxidants such as phenyl-alpha-naphthylamine, tert-octylphenol sulfide, bis-phenols such as 4,4'-methylene bis(3,6-di-tert-butylphenol), viscosity index improvers such as the ethylene-higher olefin copolymer, polymethylacrylates, polyisobutylene, alkyl fumaratevinyl acetate copolymers, and the like as well as other ashless dispersants or detergents such as overbased sulfonates.

The invention is further illustrated by the following Examples.

EXAMPLE 1

Preparation of the hydrogenated, DVB (divinylbenzene)-coupled copolymer of styrene and isoprene.

679 g of isoprene and 226 g of styrene in 4123 g (5292 ml) of dry cyclohexane were polymerized under nitrogen with Li-sec-butyl at ~50° C. to a "living" tapered copolymer with $\overline{Mn}=35,000$. 131 g of this solution were withdrawn for analytical purposes.

Then 3.2 equivalents/Li of dry technical grade divinylbenzene (77.8 ml of a solution in cyclohexane containing 1.036 mol/l) were added and the coupling reaction was allowed to proceed for 2.5 hours. Then 93.1 ml of a solution of 0.407 mol/l of 2-ethyl-hexanol-1 in cyclohexane were added to the orange/red solution and a sample (95.0 g) was saved for analysis.

Hydrogenation was effected as usual applying a catalyst prepared from aluminum-triethyl and Ni-octoate (1.04 g Ni/kg of polymer) and added as three increments. Degree of hydrogenation of aliphatic double bonds: 99.5 (by ozone tritration after 8.5 hrs at 65° C.
Molecular weights
All molecular weights were determined by GPC (gel permeation chromatography):
(1) $\overline{Mn}$ of linear polyisoprene: 34,000
(2) M(peak) of star before hydrogenation: 374,000
(3) coupling yield; %: 94
(4) M(peak) of hydrogenated star: 428,000
Viscometry
The viscometric evaluation was carried out in a 10W/50 super motor oil formulation containing 2.08%w of the functionalized star polymer, 15%w of a commercial addition package and 0.3%w of a polyalkylmethacrylate pour point depressant in HVI-oil Kuwait (4.90 cSt 100° C.) (HVI=high viscosity index Vk=kinematic-viscosity):
Vk(100° C.): 19.7 cSt
Vk(40° C.): 129.4 cSt
Vk(150° C.): 7.99 cSt
VI: 174
V(−18° C.): 2.38 Pa.s
Shearstability
(DIN 51382); %: 3.5

EXAMPLE 2

Functionalization with 2-vinyl pyridine.

In a 12 l autoclave fitted with stirrer and heating-/cooling device were charged under inert conditions the solution of 303.3 g of the hydrogenated, tapered copolymer of styrene and isoprene (dried over phosphorus pentoxide) in 5559 g of dry cyclohexane and 131.3 ml of a dry 0.23 molar solution of N,N,N',N'-tetramethyl-ethylenediamine in cyclohexane.

After addition of 129 ml of a 0.235 molar solution of Li-sec-butyl the reaction mixture was heated of 70° C., kept at this temperature for 45 minutes and then cooled to 25° C.

At this temperature 179.4 ml of a dry 0.335 molar solution of freshly distilled 2-vinyl pyridine in dry cyclohexane were added followed by 20 ml of the same solvent. The color of the cement changed from pale yellow to red/brown. After 20 minutes the reaction was terminated by the addition of 149 ml of a dry 0.407 molar solution of 2-ethyl-hexanol-1 in cyclohexane which caused the color to disappear.
Molecular weight
The molecular weight is by GPC
M(peak) of the functionalized star polymer: 476,000
Nitrogen content
(a) target: 0.28%w
(b) according to ASTM D 2896: 0.30%w
(c) according to SMS-1730: 0.20%w
Viscometry
The viscometric evaluation was carried out using 1.8%w of polymer in the same formulation as above:
Vk(100° C.): 19.1 cSt
Vk(40° C.): 124.2 cSt
Vk(150° C.): 7.56 cSt
VI: 174
Shearstability
(DIN 51382); %: 10

EXAMPLE 3

Functionalization with 2-vinyl pyridine and acetaldehyde.

In a 12 l autoclave fitted with stirrer and heating-/cooling device were charged under inert conditions the solution of 299 g of the hydrogenated, tapered copolymer of styrene and isoprene (dried over phosphorus pentoxide) in 5481 g of dry cyclohexane and 129.5 ml of a dry 0.231 molar solution of N,N,N',N'-tetramethyl-ethylenediamine in cyclohexane.

After addition of 127.2 ml of a 0.235 molar solution of Li-sec-butyl the reaction mixture was heated to 70° C., kept at this temperature for one hour and then cooled to 25° C.

At this temperature 176.8 ml of a dry 0.335 molar solution of freshly distilled 2-vinyl pyridine in dry cyclohexane were added followed by 20 ml of the same solvent. The color of the cement changed from yellow to red/brown. After 15 minutes 70.1 ml of the dry solution of 0.448 mole/l of acetaldehyde in cyclohexane were added which caused the color to disappear. The aldehyde was allowed to react for 15 minutes after which termination was effected by the addition of 139.7 ml of a dry 0.407 molar solution of 2-ethyl-hexanol-1 in cyclohexane.
Molecular weight.
The molecular weight is by GPC.
M(peak) of the functionalized star polymer: 456,000
Nitrogen content
(a) target: 0.28%w
(b) according to ASTM D-2896: 0.28%w
(c) according to SMS-1730: 0.2%w
Viscometry
The viscometric evaluation was carried to using 1.95%w of polymer in the same formulation as above:
Vk(100° C.): 19.68 cSt
Vk(40° C.): 129.3 cSt
Vk(150° C.): 8.06 cSt
VI: 174
V(−18° C.): 2.4 Pa.s
Shearstability
(DIN 51382); %: 9.7

EXAMPLE 4

Functionalization with acetaldehyde.

In a 12 l autoclave fitted with stirrer and heating-/cooling device were charged under inert conditions the solution of 347 g of the hydrogenated, tapered copolymer of styrene and isoprene (dried over phosphorus pentoxide) in 6311 g of dry cyclohexane and 180.3 ml of a dry 0.231 molar solution of N,N,N',N'-tetramethyl-ethylenediamine in cyclohexane.

After addition of 177.1 ml of a 0.235 molar solution of Li=sec-butyl the reaction mixture was heated to 35° C., kept at this temperature for 105 minutes and then cooled to 25° C.

At this temperature 101.2 ml of a dry 0.448 molar solution of acetaldehyde in dry cyclohexane were added followed by 20 ml of the same solvent. The color of the cement changed from pale yellow to colorless. After 20 minutes the reaction was terminated by the addition of 201 ml of a dry 0.407 molar solution of 2-ethyl-hexanol-1 in cyclohexane.

Molecular weight.

The molecular weight is by GPC.

M(peak) of the functionalized star polymer: 460,000

Viscometry

The viscometric evaluation was carried out using 2.15%w of polymer in the same formulation as above:

Vk(100° C.): 19.75 cSt
Vk(40° C.): 131.3 cSt
Vk(150° C.): 7.97 cSt
VI: 172
V(−18° C.): 2.53 Pa.s

Shearstability (DIN 51382); %: 1.9

Sequence-VD performance

All formulations contained identical percentages of VI-improver and a dispersant/detergent package containing a reduced percentage of ashless dispersant in order to make the engine performance of the blends more sensitive to changes of dispersancy due to the presence of a dispersant/VI-improver.

|  | Ex. 1 (reference) | Ex. 2 | Ex. 3 | Ex. 4 |
|---|---|---|---|---|
| % w of polymer: | 1.5 | 1.5 | 1.5 | 1.5 |
| average sludge: | 9.3 | 9.7 | 9.6 | 9.4 |
| piston skirt varnish: | 6.3 | 6.4 | 6.2 | 6.3 |
| average engine varnish: | 3.8 | 5.0 | 6.3 | 3.8 |
| average cam lobe lobe wear; micron; | 3 | 7 | 14 | 5 |

What is claimed is:

1. A process for the preparation of an oil-soluble, star-shaped product having viscosity index-improving and dispersant properties, comprising modifying a hydrogenated star-shaped polymer comprising a nucleus and polymeric arms linked to said nucleus, wherein said arms are selected from the group consisting of:
    (i) hydrogenated homopolymers and hydrogenated copolymers of conjugated dienes;
    (ii) hydrogenated copolymers of conjugated dienes and mono-alkenyl arenes; and
    (iii) mixtures thereof;
wherein at least about 80% of the aliphatic unsaturation of the star-shaped polymer has been reduced by hydrogenation while less than 20% of the aromatic unsaturation has been reduced, wherein the hydrogenated polymer is metallated with an organolithium compound in the presence of a metallation promoter, and subsequently reacted with
    (a) a vinyl pyridine.

2. A process as claimed in claim 1 wherein the organolithium compound is secondary butyllithium.

3. A process as claimed in claim 1 wherein the molar ratio of organolithium compound:Li-ions is between 0.1 and 10.

4. A process as claimed in claim 1 wherein the metallation promoter is a tertiary diamine.

5. A process as claimed in claim 1 wherein the metallation promoter is N,N,N′,N′-tetramethyl ethylenediamine.

6. A process as claimed in claim 1 wherein the molar ratio of metallation promoter:organolithium compound is 0.5 to 1.2.

7. A process as claimed in claim 1 wherein the vinyl pyridine is 2- and/or 4-vinyl pyridine.

8. A product prepared according to the process of claim 1.

9. An oil composition, in particular a lubricating oil composition or concentrate comprising an oil and 0.001–45%w of the product of claim 8.

* * * * *